3,073,777
Patented Jan. 15, 1963

3,073,777
PROCESS FOR THE DESTRUCTIVE HYDROGENATION OF CRUDE OILS, TARS AND THEIR RESIDUES

Willi Oettinger, Ludwigshafen (Rhine), Germany, assignor to Badische Anilin- & Soda-Fabrik Aktiengesellschaft, Ludwigshafen (Rhine), Germany
No Drawing. Filed Feb. 17, 1960, Ser. No. 9,167
Claims priority, application Germany Feb. 19, 1959
4 Claims. (Cl. 208—59)

This invention relates to the destructive hydrogenation of crude oils, tars and their residues.

It is known to subject crude oils, tars or their residues to destructive hydrogenation by freeing the said initial materials from inorganic constituents under pressure with hydrogen at elevated temperature in a preliminary stage in the presence of large-surfaced materials and then effecting hydrogenation under pressure in a second stage.

I have now found that the inorganic constituents of crude oils, tars or their residues can be removed in an especially advantageous way by treating the said raw materials in the first stage (preliminary stage) in the presence of large-surfaced materials with a small amount of hydrogen and then in a second stage in the presence of hydrogenation catalysts with further amounts of hydrogen. For example the procedure in industrial operation may be that 0.1 to 0.5 normal cubic meter of hydrogen or hydrogen-containing gas per kilogram of initial material is used in the preliminary stage and thereafter the refining or destructive hydrogenation is carried out in the second stage with at least 0.4 preferably 0.5 and advantageously 0.8, 0.9, 1.0 or more normal cubic meters of hydrogen per kilogram of initial material. In many cases the use of 1.5 normal cubic meters or more of hydrogen or hydrogen-containing gas per kilogram of initial material has proved advantageous. Throughout this specification and in the appended claims, the expression "normal cubic meters of hydrogen" is employed to define the volume of hydrogen as measured under standard conditions of temperature and pressure, i.e. at 0° C. and 760 mm. Hg.

An advantageous embodiment of the process comprises leading the initial material through the preliminary stage with only the hydrogen which is freshly supplied to the system, the whole of the hydrogen which is being circulated then being added prior to the second stage.

The process according to this invention is suitable for all kinds of pressure hydrogenation, for example for the refining, cracking and/or aromatizing hydrogenation in which high boiling point initial materials, such as crude oils, tars, shale oils or their residues which boil above 300° C., as for example distillation, extraction or cracking residues, are worked up.

The said initial materials are heated to at least 250° C., advantageously to at least 300° C., for example to a temperature between 310° and 350° C. and then led into a reaction chamber provided with large-surfaced material. This reaction chamber may consist of a single vessel or a plurality of consecutive vessels. In this reaction chamber the temperature is gradually increased, for example to 370° C., 400° C. or more. The distribution of temperature when using two vessels may be for example: in the first vessel a rising temperature is chosen within the range of about 280° to 360° C. and in the second vessel a rising temperature between about 360° C. and the reaction temperature. This method ensures a satisfactory removal of ash without separation of coke taking place. It is however possible to apply increasing temperatures only in the second vessel, while in the first vessel a stationary or even slightly falling temperature is maintained. After the first reactor, and in the case of several consecutive reactors preferably after the second or last reactor, it is advantageous to withdraw 0.1 to 2% by weight (with reference to the initial material) of an ash-containing high boiling point oil.

In general the heat evolved by the hydrogenation reaction at this temperature is sufficient in order to achieve the desired temperature rise. It is also possible, however, to supply additional heat to the reaction material, for example by intermediate heating up or by the addition of hot gases at one or more places, or gases, as for example carbon monoxide or oxygen, which will react under the reaction conditions with the hydrogen with the production of heat.

In general the pressure chosen in the pretreatment is the same as is used in the subsequent hydrogenation. The hydrogenating gas may be pure hydrogen, or a hydrogen-containing gas, such as illuminating gas, town gas, water-gas, cracking gas, coke oven gas or low temperature carbonization gas.

As large-surfaced material there may be used porous materials or non-porous materials, especially open hollow bodies, as for example rings, hemispheres or angled structures, such as cubes, cones, truncated cones, boxes, pyramids, which are open at least on one side and which may contain deflecting plates within the hollow space; suitable materials are for example metallic substances, for example metals of group VIII or stainless steel, or ceramic materials, such as porcelain, clay, cement, pumice, bleaching earths, aluminas or synthetically prepared silicates. In many cases it has proved to be advantageous to add to the large-surfaced material one or more substances having catalytic activity, such as molybdenum, tungsten, chromium, vanadium, nickel, cobalt, platinum, ruthenium, gold, manganese, titanium or compounds of these or mixtures of the said elements or their compounds.

It is of special advantage if the large-surfaced material is arranged in the reaction space in such a way that the material used fills the reaction space only to one third, preferably to the extent of at least 40% and advantageously to the extent of about 50 to 70%. This may be achieved for example by using the said materials, as already mentioned, in the form of suitable rings or other voluminous open or partly closed structures offering large surfaces.

The chamber for the large-surfaced materials is in general smaller than the actual reaction chamber which is provided with the hydrogenation catalyst and in which the cracking, refining and/or aromatizing pressure hydrogenation takes place, advantageously in a plurality of stages, at pressures of 5 to 700 atmospheres, especially 20 to 300 atmospheres, and at temperatures of 350° to 550° C., preferably with rising temperature. The throughput may be chosen between 0.3 and 10 kilograms of initial material per part by volume of catalyst per hour.

The circulating gas containing hydrogen may be washed with an extraneous oil or with an oil originating from the process, for example with a heavy gasoline or a gas oil. To remove ammonia, the gas may be treated with water or an acid solution, possibly in association with an oil washing. The washing may take place in co- or counter-current, preferably under the reaction pressure.

As catalysts for the treatment there may be used those having hydrogenating, cracking, dehydrogenating, isomerizing and/or cyclizing properties, as for example oxides, sulfides, selenides, tellurides, sulfates, borates, nitrates, carbonates, halides, phosphorus compounds or also silicates of vanadium, molybdenum, tungsten, chromium, uranium, rhenium, iron, nickel, or cobalt, and also gold, silver, copper, tin, titanium lead, zinc, magnesium, cadmium, zirconium, antimony, bismuth and manganese, and also the metals of the platinum, palladium and iron groups and the heavy metals of group I or mixtures thereof. Thus for example the said compounds of molybdenum, tungsten, chromium and vanadium may be used in admixture or in chemical combination, for example as molybdates, tungstates, chromates, chromites, vanadates, or titanates, with compounds of nickel, cobalt, titanium, tin or lead and/or with the metals of the platinum and palladium group and/or heavy metals of group I and their compounds, the added substances preferably being used in smaller amounts than molybdenum, tungsten, chromium and vanadium. Molybdenum or tungsten with cobalt, nickel and/or titanium and possibly tungsten or molybdenum, for example, are especially suitable. Some elements have proved to be promoters for the more usual catalysts of groups V to VIII of the periodic system, as for example gold, silver, mercury, titanium, copper, zinc, tin or uranium and lead or compounds thereof. Mixtures are also suitable which consist of compounds of the said metals of group IV of the periodic system, for example titanium with compounds of iron, nickel, cobalt or manganese, as well as of copper, silver, gold, platinum, palladium, ruthenium or their compounds or in chemical combination as titanates. Compounds of the metals of the iron group in admixture with platinum, palladium, ruthenium, copper, silver, gold or their compounds are also suitable. These mixtures may also be used in the form of chemical compounds. Since compounds of the alkali and alkaline earth metals influence the activity of the catalysts, their activity may be adjusted by their use. The said catalysts may be applied in an amount of 0.1 to 30% by weight to carriers in moist or calcined condition. Suitable carriers are acid-treated montmorillonite, active silica, silica gel, preferably together with the oxides of titanium, thorium, zirconium and magnesium, titania gel or titanium oxide, optionally together with 0.1 to 30% by weight of $SiO_2$ as silicates, bleaching earth, fuller's earths, synthetic silicates, for example aluminum and/or magnesium silicates, and also the above-mentioned silicates, active aluminas, preferably with a surface of more than 300 square meters per gram, aluminum hydroxide or peptized aluminas, which have been treated with an amount of an acid insufficient to effect complete dissolution, bauxite, optionally with 0.1 to 25% by weight $SiO_2$, titanium oxide, zirconium oxide, cerium oxide, zinc oxide and/or magnesium oxide. When using synthetically prepared carriers, such as silica, silicates, aluminas or titanium oxide, the component with catalytic activity may be added during the production, for example by adding a soluble compound of the catalytically acting metal to the waterglass solution, to the silica sol, the titanium salt solution, the aluminum salt and/or aluminate solution, and then precipitating the solution and/or the metal or metal compound during the precipitation. It is advantageous to treat the carrier with gases, such as ammonia, hydrogen, sulfur dioxide, halogen or rare gases, and the gas may remain in the pores. The carrier may also be pretreated with hydrogen halide or an inorganic or low molecular organic monobasic or dibasic acid, suitable acids being hydrogen chloride, hydrogen fluoride, chlorosulfonic acid, formic acid or oxalic acid. The carrier may take up halogen in an amount of 0.1 to 10% by weight. The catalyst may also be molded with carbon and the carbon then wholly or partly removed by calcining.

When working under pressures up to about 150 atmospheres, the catalyst is in general reactivated from time to time with oxygen or a gas containing oxygen at temperatures of 450° to 600° C. The catalyst or the catalyst carrier or both may also be exposed prior to use to a temperature above 300° C., for example 400° to 600° C., for a prolonged period.

The catalysts may be arranged rigidly in the reactor in known manner or they may be present in the reactor in a moving condition. The initial material may be led over the catalyst with hydrogen in concurrent or countercurrent flow.

The following example will further illustrate this invention but the invention is not restricted to this example.

*Example*

A distillation residue boiling above 370° C. and containing 4.2% of sulfur which has been obtained from Near Eastern crude oil is heated up to 340° C. under a pressure of 200 atmospheres together with 0.3 normal cubic meter of hydrogen per kilogram of oil and lead into a first reactor (preliminary vessel I) which is filled with Raschig rings of clay which have been impregnated with 3.5% by weight of $MoO_3$. There is a free space of 70% by volume in the preliminary vessel I. The throughput amounts to 1.7 kilograms of oil per liter of Raschig rings per hour and the temperature at the outlet from this preliminary vessel I is 375° C.

After leaving the preliminary vessel I, the gas-oil mixture is further heated to 400° C. and led into a second reactor (preliminary vessel II) which is provided with Raschig rings of the same composition and with the same degree of filling. The throughput with reference to the preliminary vessel II is 2.0 kilograms of oil per liter of Raschig rings per hour and the temperature at the outlet therefrom is maintained at 430° C.

The mixture of gas and oil then passes, with the addition of circulating gas which has been heated up to the same temperature, into a third reactor which is filled with rigidly arranged catalyst. The catalyst consists of active alumina with 5% of silicic acid and 3% of titanium oxide which has been provided with cobalt and molybdenum oxides in such amount that the finished catalyst contains 2% by weight of cobalt and 12% by weight of molybdenum (calculated as metal). The catalyst has a cylindrical shape having a diameter of 7 mm. and about the same height. The temperature is maintained at 440° C. The throughput, with reference to this third reactor, is 0.6 kilogram per liter of catalyst per hour. In this third reactor, in which desulfurization takes place, a gas to oil ratio of 1.1 normal cubic meters of gas to 1 kilogram of oil is maintained.

The reactants then pass through a condenser into a separator in which the gas is separated from the liquid. The liquid reaction product contains 0.8% by weight of sulfur. The gas is circulated to the third reactor.

In order to maintain the highest possible hydrogen partial pressure and to avoid corrosion, the hydrogen sulfide partial pressure is kept below 1 atmosphere by washing the circulating gas.

After an operating period of three months, the system is closed down. In the preliminary vessels I and II 94% of the inorganic constituents introduced with the crude oil are found.

If a gas to oil ratio of 1.1 normal cubic meters of gas to 1 kilogram of oil is maintained in all three reactors, only about 65% of the inorganic constituents introduced with the crude oil are found in the preliminary vessels I and II.

What I claim is:

1. In a process for the refining and destructive hydrogenation of crude oils, tars and their residues as initial material by reaction with hydrogen in a first stage containing large-surfaced materials and by further reaction with hydrogen in a second stage in the presence of a hydrogenation catalyst and at a temperature of 350° C. to 550° C., the pressure in both stages being in a range of about 5 to 700 atmospheres, the improvement which comprises: heating said initial material to a temperature between about 250° C. and 350° C.; then leading said initial material through said first stage together with about 0.1 to 0.5 normal cubic meters of hydrogen per kilogram of initial material and subsequently through said second stage together with about 0.5 to 1.5 normal cubic meters of hydrogen per kilogram of initial material.

2. A process as claimed in claim 1 wherein the temperature in said first stage is gradually increased from said temperature between 250° C. and 350° C. up to not more than the reaction temperature in said second stage.

3. A process as claimed in claim 1 wherein the pressure in both stages falls in a range of about 20 to 300 atmospheres and the initial material is heated to a temperature between about 300° C. and 350° C. before being led through said first stage.

4. A process as claimed in claim 3 wherein the pressure is approximately equal in both stages.

References Cited in the file of this patent
UNITED STATES PATENTS

| | | |
|---|---|---|
| 2,098,400 | Pier et al. | Nov. 9, 1937 |
| 2,706,705 | Oettinger et al. | Apr. 19, 1955 |